US011522992B2

(12) United States Patent
Vicari

(10) Patent No.: US 11,522,992 B2
(45) Date of Patent: Dec. 6, 2022

(54) PORTABLE COMPUTING DEVICES OPTIMIZED FOR DISPLAYING DIFFERENT CONTENT TYPES AND SINGLE ACTION-PROGRAMMED GRAPHICAL USER ELEMENTS, AND METHODS/SYSTEMS OF USE THEREOF

(71) Applicant: Broadridge Investor Communication Solutions, Inc., Newark, NJ (US)

(72) Inventor: Joseph Vicari, Edgewood, NY (US)

(73) Assignee: Broadridge Investor Communication Solutions, Inc., Newark, NJ (US)

( * ) Notice: Subject to any disclaimer, the term of this patent is extended or adjusted under 35 U.S.C. 154(b) by 0 days.

(21) Appl. No.: 17/488,917

(22) Filed: Sep. 29, 2021

(65) Prior Publication Data
US 2022/0239772 A1     Jul. 28, 2022

Related U.S. Application Data

(60) Continuation of application No. 16/658,957, filed on Oct. 21, 2019, which is a continuation of application
(Continued)

(51) Int. Cl.
*H04M 1/72* (2021.01)
*H04M 1/72454* (2021.01)
(Continued)

(52) U.S. Cl.
CPC ........ *H04M 1/72454* (2021.01); *G06Q 40/06* (2013.01); *G07C 13/00* (2013.01); *H04M 1/72457* (2021.01)

(58) Field of Classification Search
CPC .......... H04M 1/72454; H04M 1/72457; G06Q 40/06; G07C 13/00
See application file for complete search history.

(56) References Cited

U.S. PATENT DOCUMENTS 5,802,499 A   9/1998   Sampson et al.
5,878,399 A   3/1999   Peralto
(Continued)

FOREIGN PATENT DOCUMENTS

FR   2855630 A1   12/2004
WO   01/02985 A2   1/2001

OTHER PUBLICATIONS

Proxy Vote® http://irwebreport.com/perspectives/perimages/proxyvote2007a.gif 1 page.
(Continued)

*Primary Examiner* — Mazda Sabouri
(74) *Attorney, Agent, or Firm* — Greenberg Traurig, LLP

(57) ABSTRACT

In one embodiment, the instant disclosure provides a portable computing device that includes at least: a processor; a non-transient computer media; computer instructions, and where, when the processor executes the computer instructions, the portable computing device is programmed to: transmit an electronic request to establish a user session related to an event, where the electronic request includes a user-specific event-specific identifier that is uniquely related to a user and the event; display, during the user session, an user-specific app-like graphical user interface including: a first interface area displaying a text-based content related to the user-specific event-specific identifier and the event, a second interface area displaying a live virtual event content related to the user-specific event-specific identifier and the event, a graphical user interface element that has been programmed to automatically execute a user-specific action related to the event when a user activates the graphical user interface element in a single action.

31 Claims, 16 Drawing Sheets

Related U.S. Application Data

No. 15/438,022, filed on Feb. 21, 2017, now abandoned, which is a continuation of application No. 14/539,583, filed on Nov. 12, 2014, now abandoned, which is a division of application No. 13/435,497, filed on Mar. 30, 2012, now Pat. No. 8,892,456, which is a continuation of application No. 13/419,265, filed on Mar. 13, 2012, now abandoned, which is a continuation-in-part of application No. 13/349,278, filed on Jan. 12, 2012, now abandoned.

(60) Provisional application No. 61/432,007, filed on Jan. 12, 2011.

(51) Int. Cl.
  *G06Q 40/06* (2012.01)
  *G07C 13/00* (2006.01)
  *H04M 1/72457* (2021.01)

(56) References Cited

U.S. PATENT DOCUMENTS

| | | | |
|---|---|---|---|
| 6,321,212 B1 | 11/2001 | Lange | |
| 6,338,067 B1 | 1/2002 | Baker et al. | |
| 6,796,492 B1 | 9/2004 | Gatto | |
| 7,110,981 B1 | 9/2006 | Sidikman et al. | |
| 7,207,487 B2 | 4/2007 | Faulk | |
| 7,475,817 B2 | 1/2009 | Faulk | |
| 7,640,181 B2 | 12/2009 | McClure et al. | |
| 7,882,006 B2 | 2/2011 | Gardner et al. | |
| 8,102,544 B2 | 1/2012 | Yoshimura et al. | |
| 8,370,244 B1 | 2/2013 | Daly | |
| 8,413,882 B1 | 4/2013 | Nidamarthi | |
| 9,942,519 B1* | 4/2018 | Pan | H04N 21/47 |
| 2001/0034680 A1 | 10/2001 | Purcell | |
| 2001/0037234 A1 | 11/2001 | Parmasad et al. | |
| 2002/0052816 A1 | 5/2002 | Clenaghan et al. | |
| 2002/0082907 A1 | 6/2002 | Inomata et al. | |
| 2002/0111891 A1 | 8/2002 | Hoffman et al. | |
| 2002/0198809 A1 | 12/2002 | Daley et al. | |
| 2003/0028467 A1 | 2/2003 | Sanborn | |
| 2003/0042305 A1 | 3/2003 | Jacobs et al. | |
| 2003/0163686 A1 | 8/2003 | Ward et al. | |
| 2003/0225671 A1 | 12/2003 | Miller et al. | |
| 2004/0044612 A1 | 3/2004 | Leroy | |
| 2006/0095376 A1 | 5/2006 | Mitchell et al. | |
| 2006/0219179 A1 | 9/2006 | Gardner et al. | |
| 2007/0087820 A1 | 4/2007 | Van Luchene et al. | |
| 2007/0192176 A1 | 8/2007 | Onischuk | |
| 2007/0219886 A1 | 9/2007 | Cooke | |
| 2008/0296375 A1 | 12/2008 | Haas et al. | |
| 2009/0063431 A1 | 3/2009 | Erol et al. | |
| 2009/0138343 A1 | 5/2009 | Knowles et al. | |
| 2009/0204640 A1 | 8/2009 | Christensen et al. | |
| 2009/0240631 A1 | 9/2009 | Barlavi | |
| 2009/0259719 A1 | 10/2009 | Kindberg et al. | |
| 2009/0271261 A1 | 10/2009 | Mehta et al. | |
| 2009/0316199 A1 | 12/2009 | Yoshimura et al. | |
| 2011/0125561 A1 | 5/2011 | Marcus | |
| 2011/0143714 A1 | 6/2011 | Keast et al. | |
| 2011/0153398 A1 | 6/2011 | Tjhai et al. | |
| 2011/0153595 A1 | 6/2011 | Bernstein et al. | |
| 2011/0169970 A1 | 7/2011 | Wesby | |
| 2011/0202397 A1* | 8/2011 | Lam | G06Q 30/0252 705/14.5 |
| 2011/0270751 A1 | 11/2011 | Csinger et al. | |
| 2012/0053997 A1 | 3/2012 | Garfinkle et al. | |
| 2012/0091202 A1 | 4/2012 | Cohen et al. | |
| 2012/0117570 A1 | 5/2012 | Ozaki et al. | |
| 2012/0138671 A1 | 6/2012 | Gaede et al. | |
| 2012/0164982 A1 | 6/2012 | Klein | |
| 2012/0173305 A1 | 7/2012 | Bhaskaran | |
| 2012/0209931 A1 | 8/2012 | Antell | |
| 2012/0284092 A1 | 11/2012 | Vicari | |
| 2013/0110978 A1* | 5/2013 | Gordon | H04N 21/4788 709/218 |

OTHER PUBLICATIONS

Securities Regulation in Cyberspace, Third Edition, Aspen Publishers, 2004, 18 pages.
Proxy Voting Gets Wired, Communicating With Investors Cost-Effectively, Nov. 1999, pp. 7-8.
The University of Melbourne, Centre for Corporate Law & Securities Regulation, The Online Corporation: Electronic corporate communications, Discussion paper, Dr. Elizabeth Boros, Dec. 1999, 37 pages.
Corporate Governance in Cyberspace: Proxy Statements, Annual Reports, And The Virtual Shareholders' Meeting, 2004 Supplement, 11.01 Electronic Distribution of Proxy Statements And Shareholders' Meeting Information, 46 pages.
Welcome to ProxyVote.com, website 9 pages.
Transfer Agent, Harris Bank Shareholder Services, Computershare Investor Services as of Jul. 1, 2000, Copyright 2000, Safevote, Inc., CONFIDENTIAL safevote.com, Harris Bank Report.doc, 9 pages.
Technology Company, Direct Report Corporation, Shareholder.com, Copyright 2000, Safevote, Inc., Confidential safevote.com, Direct Report Corp Tech report.doc, 29 pages.
Daly, "New technologies for new engagement benefits on offer are greater opportunities for shareholders to participate in the annual meeting, higher levels of voting participation, more transparency, and lower costs. (Annual Meetings)"; Directors & Boards, 35, 2, 30(3); Winter 2011; pp. 1-3.
Wenger, "Supporting communities of practice a survey of community-oriented technologies", Draft, Version 1.3, Mar. 2001, 68 pgs.
Boselovic, "Heard Off the Street: Message posters take their dismay to the boardroom", Apr. 21, 2003, 3 pgs.
"Company Takes Earnings Call Onto Online Message Board", Investor Relations Business, Dec. 13, 1999, vol. 4 Issue 24, p. 1, 3 pgs.
Friedman, "Securities Regulation in Cyberspace, Third Edition", (c) 2004 Aspen Publishers, Inc., 214 pgs.
Boros, "Virtual Shareholder Meetings", Duke Law & Technology Review, 2004, No. 8, 9 pgs.
Johnson, "Siebel makes shareholders meeting Web-only", Mercury News, May 15, 2003, 3 pgs.
Business Editions & Internet Writers; Business Wire; "Yahoo! Gives Consumers Online Access to Brokerage Account Information; E-Trade Is First Online Financial Services Company to Join Yahoo's Online Account Access Program"; May 2000; pp. 1-3.

* cited by examiner

FIG. 1

PORTABLE COMPUTING DEVICES OPTIMIZED FOR DISPLAYING DIFFERENT CONTENT TYPES AND SINGLE ACTION-PROGRAMMED GRAPHICAL USER ELEMENTS, AND METHODS/SYSTEMS OF USE THEREOF

RELATED APPLICATIONS

This application is a continuation of U.S. patent application Ser. No. 16/658,957, filed Oct. 21, 2019, which is a continuation of U.S. patent application Ser. No. 15/438,022, filed Feb. 21, 2017, which is a continuation of U.S. patent application Ser. No. 14/539,583, entitled "COMPUTER METHODS AND COMPUTER SYSTEMS FOR VOTING", filed Nov. 12, 2014, which is a divisional of U.S. Pat. No. 8,892,456, entitled "COMPUTER METHODS AND COMPUTER SYSTEMS FOR VOTING", filed Mar. 30, 2012, which is a continuation of U.S. patent application Ser. No. 13/419,265, entitled "COMPUTER METHODS AND COMPUTER SYSTEMS FOR VOTING," filed on Mar. 13, 2012, which is a continuation-in-part of U.S. patent application Ser. No. 13/349,278, entitled "COMPUTER METHODS AND COMPUTER SYSTEMS FOR VOTING," filed on Jan. 12, 2012, which claims the priority of U.S. provisional application Ser. No. 61/432,007, entitled "METHODS AND SYSTEMS FOR PROXY VOTING THROUGH PORTABLE DEVICES OF LIMITED COMPUTER INTERFACE ABILITIES," filed on Jan. 12, 2011.

TECHNICAL FIELD

In some embodiments, the instant disclosure relates to improved portable computing devices optimized for displaying different content types and single action-programmed graphical user elements, and methods of use thereof.

BACKGROUND

There are different types of portable computing devices that are produced by various manufacturers.

SUMMARY OF INVENTION

In some embodiments, the instant disclosure provides a portable computing device that includes at least: at least one processor; a non-transient computer media; computer instructions, stored in the non-transient computer media; and where, when the at least one processor executes the computer instructions, the portable computing device is programmed to: transmit an electronic request to establish a user session related to an event, where the electronic request includes a user-specific event-specific identifier that is uniquely related to a user and the event; display, during the user session, at least one user-specific app-like graphical user interface including: a first interface area displaying a text-based content related to the user-specific event-specific identifier and the event, a second interface area displaying a live virtual event content related to the user-specific event-specific identifier and the event, at least one graphical user interface element that has been programmed to automatically execute at least one user-specific action related to the event when a user activates the at least one graphical user interface element in a single action, where the first interface area and the second interface area are different, and where, during the session, the portable computing device provides, via the at least one app-like graphical user interface, an app-like experience that is based on: the user-specific event-specific identifier and a plurality of: a type of the portable computing device, a resolution of the portable computing device, a size of a screen of the portable computing device, a capability of the portable computing device, a geographic location of the portable computing device, and any combination thereof; transmit, during the user session, at least one instruction to automatically execute at least one user-specific action related to the event when a user activates the at least one graphical user interface element in a single action; and where the portable computing device maintains the at least one user-specific app-like graphical user interface only during the user session.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIG. 1 is an exemplary screen of Proxyvote.com described in the Background section.

Figure 2A:
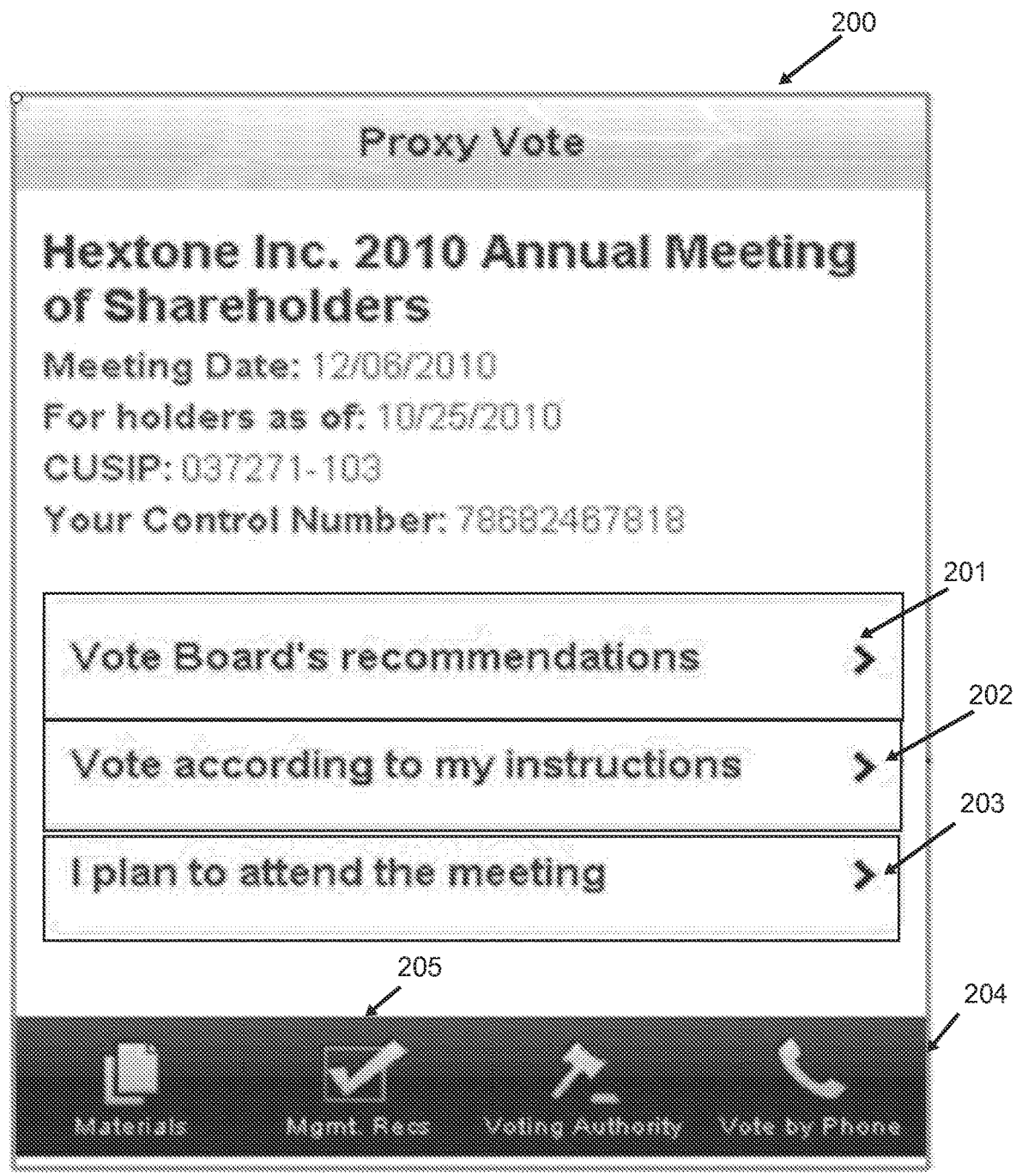
FIGS. 2A-2G show some embodiments of the instant invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In addition, as used herein, the term "official vote(s)" means information used for calculating (e.g., by a voting tabulator) the numerical voting requirements of a voting (e.g., a number of votes that are "For" on a voting issue (e.g., management's proposal).

Figure 1:
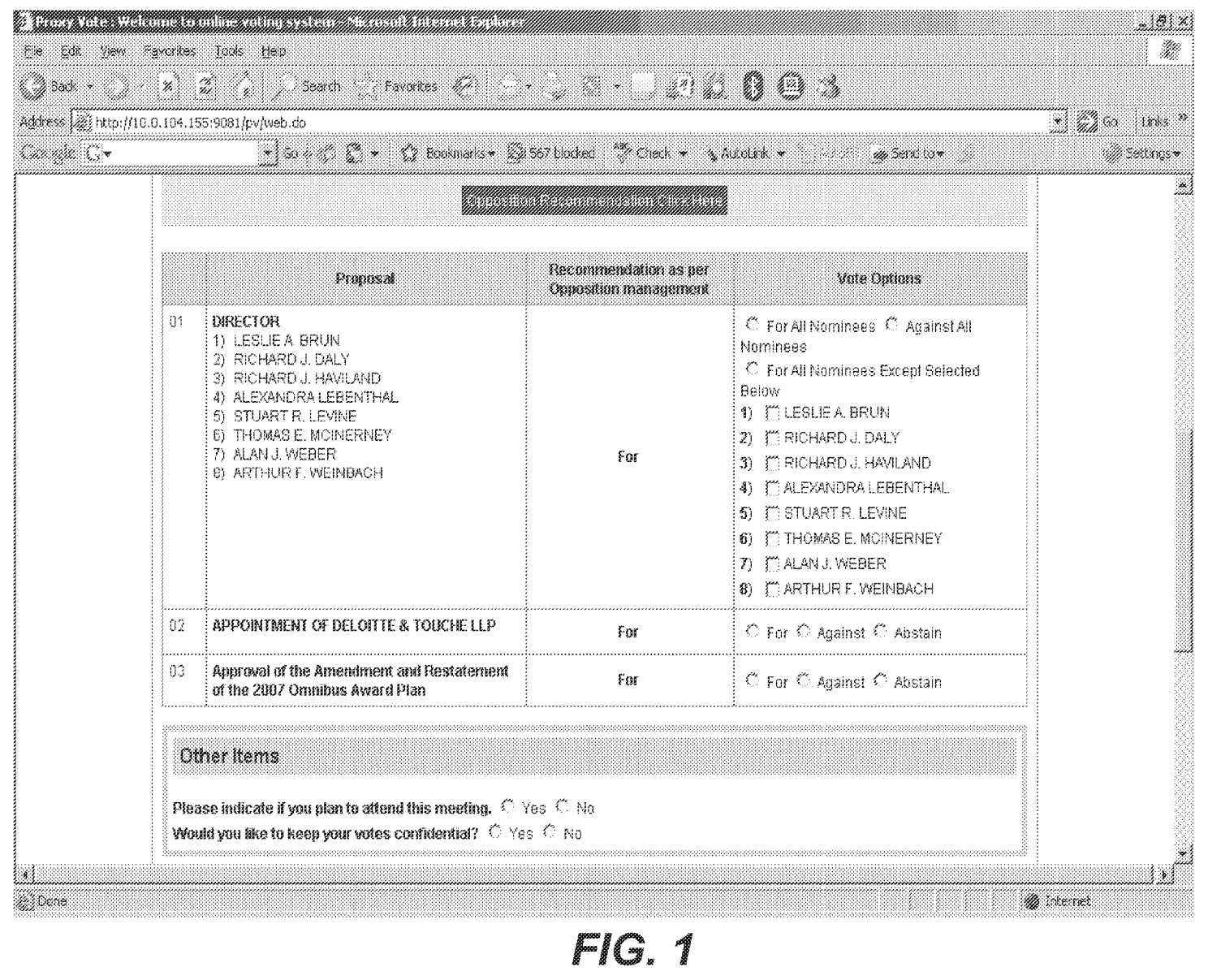

In some embodiments, in contrast to some web-based voting systems, as detailed above regarding Proxyvote.com and illustrated by FIG. 1, the instant invention can provide a different experience due to its display and flow that is modified to provide a positive voting experience that behaves like a native application on any electronic device, including personal mobile devices such as, but not limiting to, tablets (e.g., iPad), smart phones (e.g., iPhone, Blackberry, etc.) and other similar devices.

As illustrated in FIG. 2A, in some embodiments, for a voting on corporate issues, the instant invention can display a screen 200 that offers the following voting options:
a) Vote Boards recommendations (201);
b) Vote according to my instructions (202); and
c) View Management recommendations (203).

In some embodiments, by selecting/clicking on the "Vote Boards recommendations" option (201), the instant invention allows the user to automatically vote all of the proposals, in a one-selection (i.e., a single action fashion), as Management has recommended and route the voter to, for example, a "Thank You" screen.

In some embodiments, the single action includes, but not limited to, a single click on the respective control displayed to the user. In some embodiments, the single action is an action performed immediately after the presentation of the vote issue and without any intervening action.

In some embodiments, the single action is an action performed immediately after the presentation of the vote issue and without any intervening action, but not necessarily immediately after the first presentation or every presentation of the vote issue.

In some embodiments, the instant invention provides a functionality to view management recommendations by going through an icon "Mgmt Recs" (205) in a footer menu (204). In some embodiments, by choosing the "Mgmt Recs" option (205), the instant invention can sequentially present to the user each proposal on the agenda (e.g., a single proposal per a screen) along with the "Vote Management's (Board's) recommendation" option for each proposal.

Figure 2B:
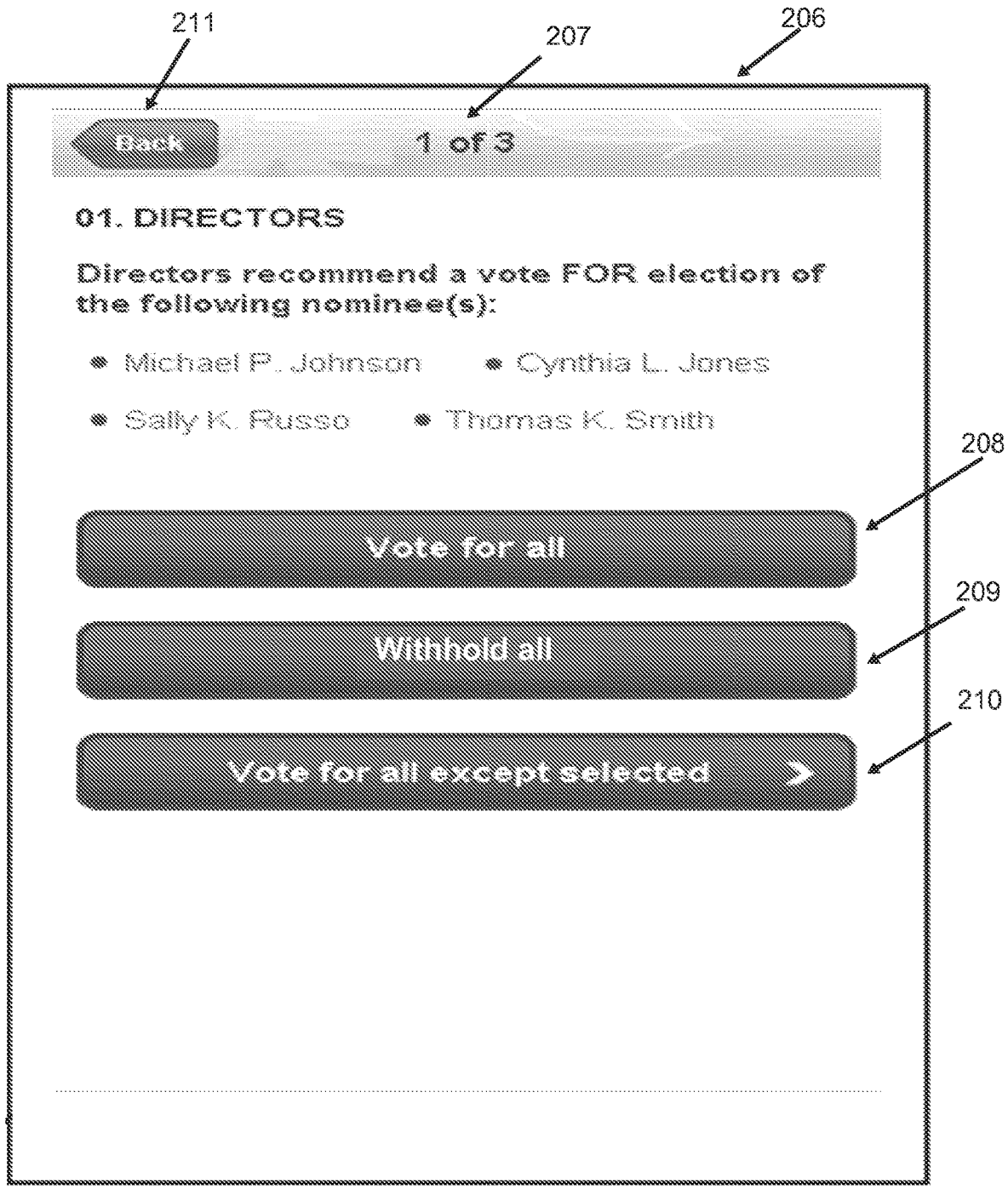
Figure 2C:

In some embodiments, as shown in FIG. 2A, by selecting "Vote according to my instructions" (202), the instant invention can allow the user to vote one-proposal-at-a-time presentation, shown in FIGS. 2B-2E, rather than the one page approach shown in FIG. 1. In some embodiments, as shown in FIG. 2B, by selecting "Vote for all" or "Withhold all" options (208, 209), the instant invention allows the voter to vote each respective option with the single action (e.g., a single click).

In some embodiments, as shown for example in FIGS. 2A-2B, each voting screen (e.g., 200, 206) can provide a proposal number (207) that the voter they are viewing out of the total number of the voting issues (e.g., proposals) that the voter can individually vote on (e.g., "1 of 3"). In some embodiments, as shown for example in FIGS. 2A-2B, each voting screen (e.g., 200, 206) can provide an ability to move back (211) to the previous proposal.

Figure 2D:
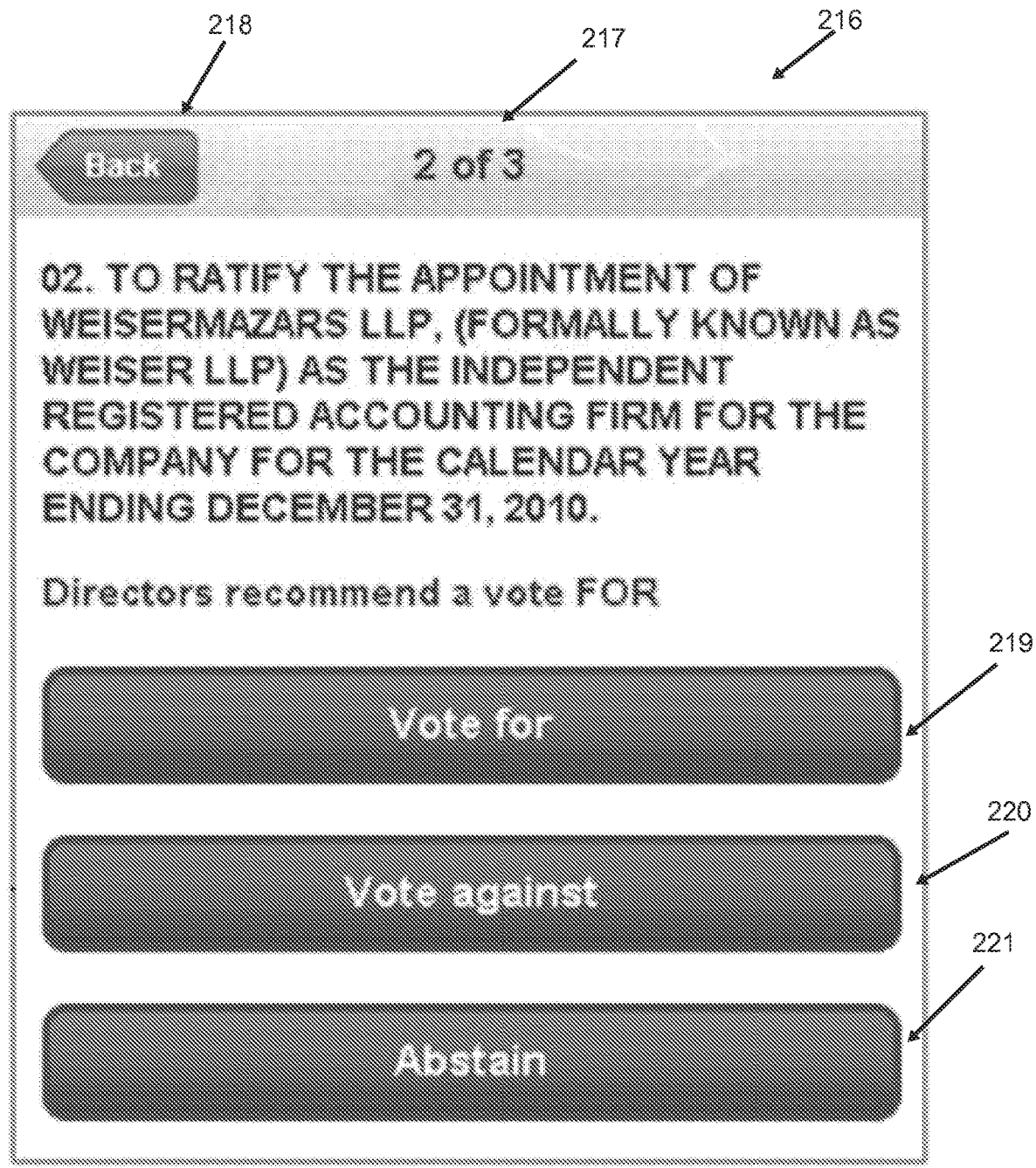

In some embodiments, as shown in FIG. 2D, by selecting a "Vote for" option (219), a "Vote against" option (220), or an "Abstain" option (221), "the instant invention can allow the user to vote each respective option with the single action (e.g., a single click).

Figure 2E:
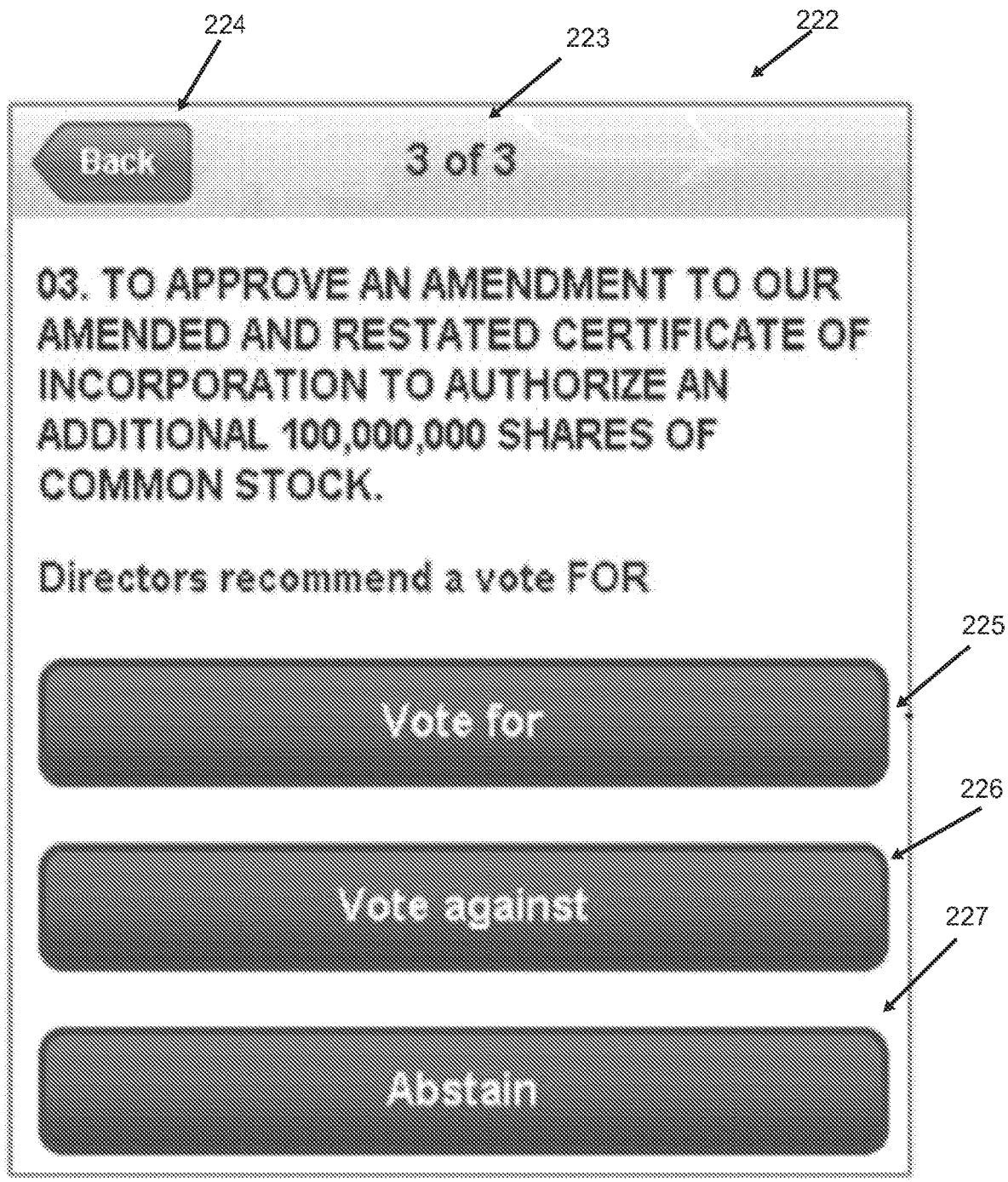

In some embodiments, as shown in FIG. 2E, by selecting a "Vote for" option (225), a "Vote against" option (226), or an "Abstain" option (227), "the instant invention can allow the user to also vote each respective option with the single action (e.g., a single click) on a third proposal (223) on a voting screen (222).

In some embodiments, the total number of shown on a voting screen can reflect all proposals, including the director proposal plus all "other items" that are votable. In some embodiments, other items can be displayed immediately after the last proposal. In some embodiments, other items are individually displayed, and each item is voted with the single action. In some embodiments, voting on a first proposal or an other item can automatically cause the next proposal to be displayed to the voter.

In some embodiments, the font size can be driven by a database of device resolution, screen-size and/or capabilities of the voter's device such that each voting item is optimally presented allowing the voter to vote in the single action.

In some embodiments, the instant invention allows for a modified vote confirmation. As described in the Background section and shown in FIG. 1, a typical web-based voting experience is at least a multi-step process where a plurality of voting issues are presented to a voter first (Step 1), then a voter makes selections on the voting issues (Step 2), the voter submits the plurality of vote decisions/selection (Step 3), the voter is asked to confirm his or her selection and finally to vote the shown selections on the confirmation page (Step 4). In contrast, in accordance with the instant invention, in some embodiments, the inventive confirmation page immediately follows the single-action voting and represents that the voter has voted in the single action and no further action from the voter is required to effectuate his or her vote. In some embodiments, the instant invention allows the user to return to the voting screen by, for example, selecting a "Change your vote" option (229) to vote again on the previously voted issue(s).

Figure 2F:
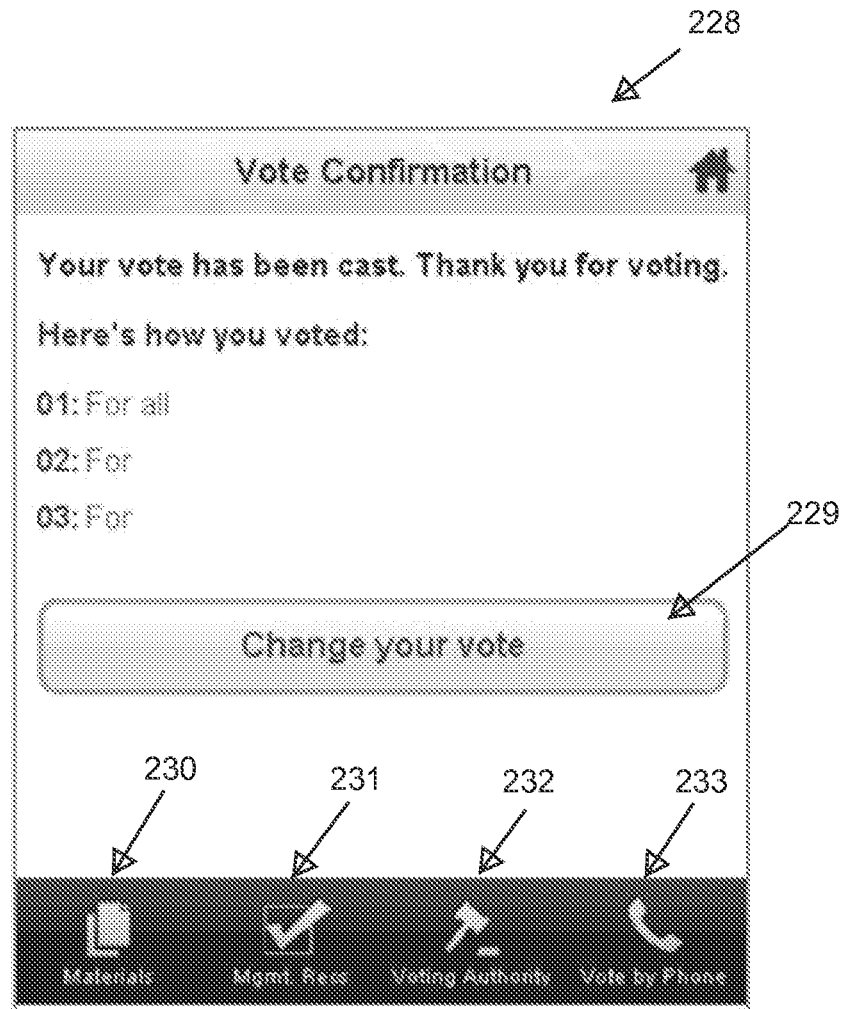
Figure 2G:

In some embodiments, as shown for example in FIGS. 2E and 2F, the instant invention allows for a functionality of automatically dialing a call to a telephone voting system by making a single-action selection of a "Vote by Phone" option (233) on a footer menu. In some embodiments, the selecting the "Vote by Phone" option (233), a call to the telephone voting system is automatically launched and, for example, the voter's control number is automatically provided to the telephone voting system.

In some embodiments, the selecting the "Vote by Phone" option (233) allows the voter to vote on some proposals using the voting screen and on others through the telephone voting system. In some embodiments, the confirmation page (228) is automatically updated with a combination of vote decisions made by the voter through the voting screen(s) (e.g., 206, 216, 222) and through the telephone voting system.

Additional Illustrative Examples of Some Embodiments of the Instant Invention

Example 1

In some embodiments, the instant invention enables the Internet's proxy vote web sites to be fully integrated with e-delivery communication to portable devices of limited computer interface abilities. In some embodiments, the instant invention enables the retail shareholder to vote using portable devices of limited computer interface abilities. In some embodiments, the instant invention enables the retail shareholder to vote using their mobile phone by providing e-mail with a smart link that logs them directly into the proxy voting web site and land on a page displaying the agenda to be voted on. From there they should be able to clearly read the agenda language and easily submit their voting instructions. In some embodiments, the instant invention increases shareholder participation.

Example 2

In some embodiments, the instant invention can have one or more of the following functionalities.

1) E-delivery Integration—Ability for user to open e-delivery e-mail on mobile device, click link to Proxyvote.com and land on agenda to be voted.

2) Mobile device support—The application should be functional in all mobile devices that support web browsing.

3) Authentication and Authorization—Control number and PIN based authentication as well as Meeting and control number authorization.

4) Proxy Voting—Display of agenda to be voted on based on control number and capture of voting instructions.

5) Viewing of Electronic Proxy Material—Ability for shareholder to click links to HTML and PDF versions of Proxy Material and view on their mobile device.

6) Legal Proxy.

7) Notice and Access Fulfillment—Ability for shareholders to request printed copies of proxy material for Notice and Access mailings.

8) Display of Appointee Language—Display of Appointee language prior to agenda when applicable.

9) Shareholder Forum and VSM content when applicable—Display of Shareholder Forum and Virtual Annual Meeting content when applicable.

10) Multilingual Capabilities—Support for English, French and Dutch languages.

11) Blocking of Certain Agenda Types—Ability to block user from accessing agendas not supported in this release and display a message. Examples included Canadian jobs and Contest short slates.

12) Confirmation E-mails—Provide e-mail confirmation box on final page that allows user to request an e-mail confirmation. Have users e-mail address filled in as default if available.

13) Contest short slate agendas—On contest opposition agendas with short slate enabled, display a text box with custom verbiage (customizable thru Workbench) preceding it. This text box will be used by the voters to vote for the nominees that are not displayed on the voting page.

14) On Canadian jobs (BC service type), display an Appointee text box that allows a shareholder to supply the name of an individual who will serve as their Proxy at the meeting and vote on their behalf.

15) Annual Interim Questions (AIQ) may apply to Canadian jobs only. Allows the shareholder to request Annual Interim Financial Statements through extra questions to be displayed at the bottom of the agenda page.

16) Custom Branded Web Sites—Provide capability to custom brand the mobile proxy voting website site for an issuer, fund or broker.

17) Investor Delivery Support—Have proxy voting website and PV Mobile site incorporate the functionality of Investor Delivery. Requires Investor Delivery exit strategy.

Example 3

In some embodiments of the instant invention, e-delivery e-mails are sent nightly to all shareholders that have opted in for that delivery service. In some embodiments of the instant invention, the e-mails contain information about a company's annual meeting along with a link to, for example, Proxyvote.com. In some embodiments of the instant invention, the e-mails are sent in either text or HTML format. In some embodiments of the instant invention, the link to proxy vote is always clickable. In some embodiments of the instant invention, the actual URL to Proxyvote.com has the shareholders control number embedded in so that Proxy vote can accept this parameter and automatically log them in.

Example 4

In some embodiments of the instant invention, the following is an exemplary integration and flow between e-delivery e-mails and a proxy voting website.

1) User receives e-delivery e-mail on their mobile device.

2) From the same mobile device, the user clicks link to a proxy voting website in their e-mail.

3) The proxy voting website recognizes that a mobile device is attempting to access it and redirects them to the Mobile proxy voting website application, keeping all of the URL parameters (control number) in place.

4) The instant invention parses control number out of the Query String and authenticates the user.

5) Upon successful authentication the user is routed to the Agenda Page which displays the agenda that is associated with the control number they logged in with.

Example 5

In some embodiments, the instant invention can have one or more of the following additional functionalities:

1) supporting any mobile device that supports web browsing, 2) unbeknownst to the user, proxy voting website will detect that they are accessing the site from a mobile device and route them to a mobile compatible web site. Depending on the type of mobile device being used, the web site will be rendered to best provide all of the site features and functionality in a manner that allows for optimum usability. The end result should be a delighted shareholder as a result of their extremely quick and successful mobile proxy voting experience.

Example 6

In some embodiments, a user interface of a user's device can be optimized for mobile devices and provides the user with an app-like (e.g., iPhone's applets) experience.

Example 7: Authentication and Authorization

In some embodiments, the instant invention uses a 12-digit control number to authenticate and authorize a shareholder. The control number is associated with the company's meeting and agenda to be voted on. There are business rules that prevent meetings to be voted on or after meeting date as well as certain control number status codes that are not votable. These business rules are mostly handled through authentication API.

In some embodiments, the instant invention can have one or more of the following additional functionalities:

1) The mobile web application will need to call in to the proxy voting website's authentication API (e.g., getAccountDetails) to authenticate the control number and retrieve all of the associated account business data required to proceed.

2) Upon successful authentication the user should be routed to the agenda page for voting.

3) If authentication or authentication failed, the appropriate error message should be displayed. Examples of error messages follow.

Proxy Voting

Example 8

In some embodiments, the instant invention can display agenda to be voted on based on control number and capture of voting instructions.

Example 9: Viewing of Electronic Proxy Material

In some embodiments, the instant invention can provide electronic access to meeting-related materials (e.g., Annual Reports, Proxy Materials) in PDF or HTML format.

In some embodiments, the instant invention can have one or more of the following additional functionalities.

1) The mobile proxy voting website should allow viewing of this electronic material. The links will be viewable and clickable from the Agenda page.

2) The links will be retrieved by calling into the Meeting API.

3) In addition, the instant invention can track every time a Material link is clicked. This is accomplished by calling into the Material Link API.

Example 10: Legal Proxy

Figure 3:
FIG. 3 shows a screen utilized in another embodiment of the instant invention.
Figure 4A:
FIGS. 4A-4E show yet some other embodiments of the instant invention.
Figures 4B, 4C:
Figure 4D:
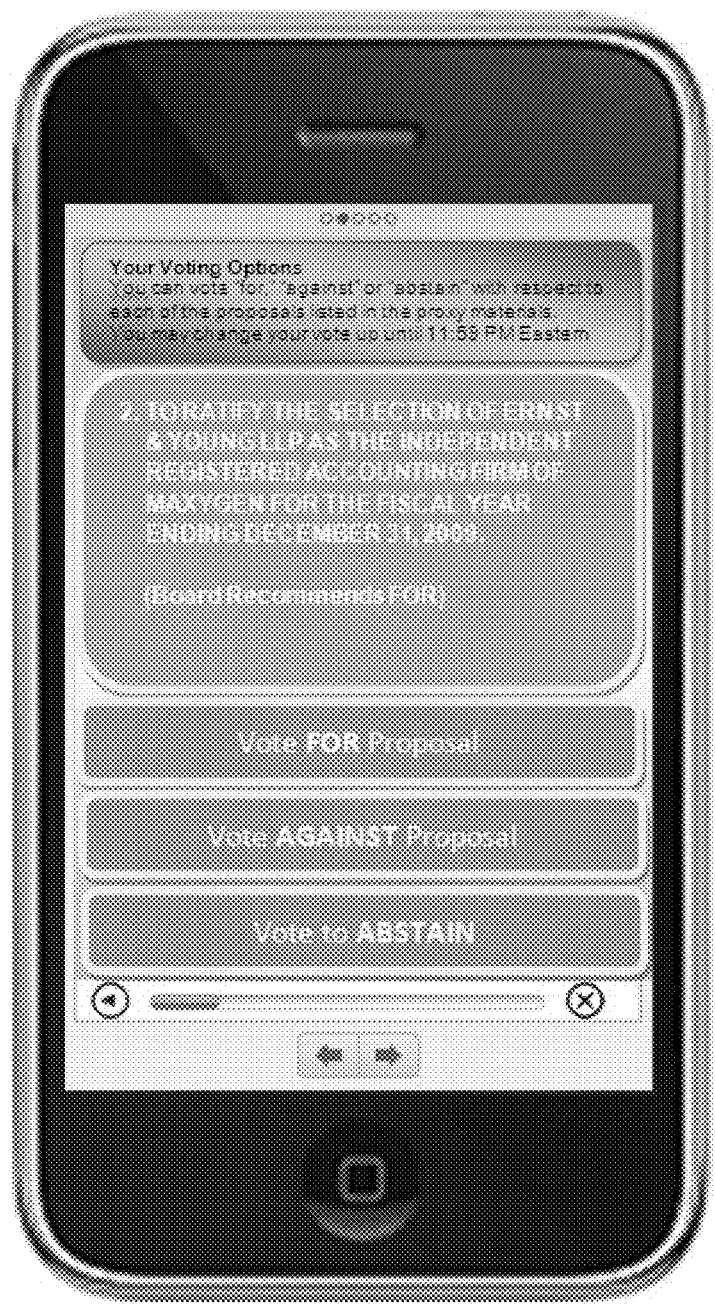
Figure 4E:
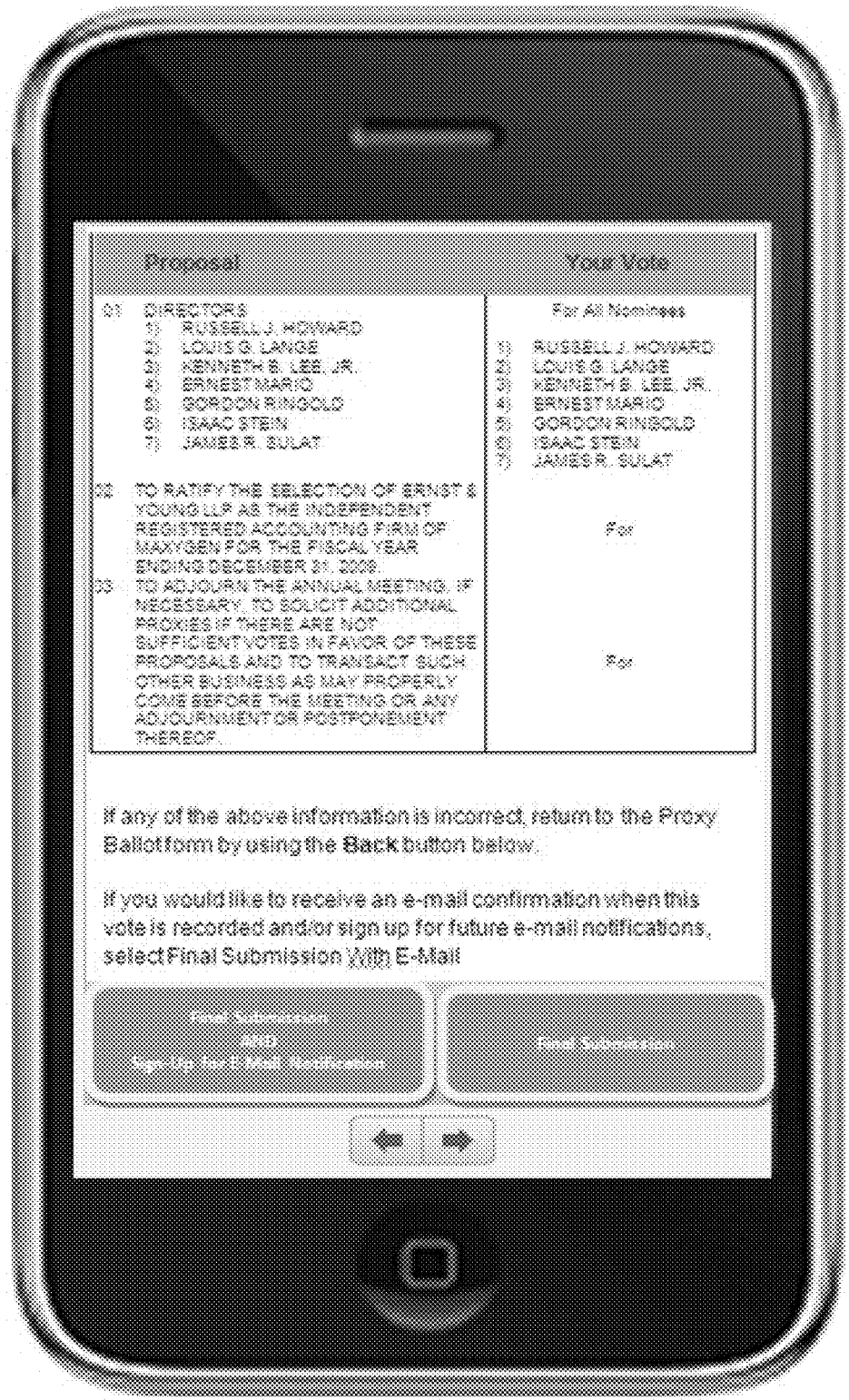

In some embodiments, the instant invention can allow a shareholder to indicate that they will attend the meeting and vote their shares in person (and in the process forfeit the ability to do so online). This process is referred to as requesting Legal Proxy. Once a request for Legal Proxy is processed, the user will no longer be able to access the Agenda screen and vote in proxy voting website. FIG. 3 shows an exemplary screen of the legal proxy language provided to the voter.

In some embodiments, the instant invention can have one or more of the following additional functionalities.

1) The mobile voting web can record the shareholder consent for attending a meeting and submitting the votes at the meeting.

2) The mobile voting web can allow the shareholder to provide their email address if they wish to be notified when their votes are recorded for the tabulation. This e-mail address should default if available.

3) All the validations for the legal proxy are at the meeting level, A Legal proxy block will appear to the shareholder based, for example, on the following conditions in the meeting DTO are met:
If the Meeting_Type_cd is not 'It'
If the Vote_instruction is not '4'
If the Market_Key is not 'BC' or 'DE'.

In some embodiments, Table 1 provides exemplary exceptions on when the Legal Proxy can be presented to the shareholder.

TABLE 1

Meeting Types Exceptions

| Vote Instruction | Meeting Type Code | Meeting Type | Legal Option |
|---|---|---|---|
| 4 | R | Registered | No |
| 3 | R | Beneficial | Yes |
| 2 | R | Beneficial | Yes |
| 1 | R | Beneficial | Yes |
| * | * | Beneficial | Yes |

Any combinations of other meeting type codes and Vote instructions (except R and 4) have legal option. Vote instruction code '4' may indicate it's a registered meeting.

Example 11

Notice and Access Fulfillment

In some embodiments, when a job mails using Notice and Access (no paper material was mailed to the shareholder by default—the shareholder has to explicitly request it), a shareholder can request an email or paper delivery of the electronic materials and can also elect to enroll for email or paper delivery of this material in the future. In some embodiments, there are the following fulfillment options that the shareholder can choose from on Notice and Access mailings.

1) Please send a full set of proxy materials related to this control number to the same address as the Notice at no cost to me.

2) Please send a full set of proxy materials by mail for all future meetings to the same address as the Notice at no cost to me and email the proxy materials related to this control number to the email address below.

3) Please send a full set of proxy materials related to this control number by email to the email address below.

4) Please send a full set of proxy materials related to this control number by mail for this meeting and for all future meetings to the same address as the Notice at no cost to me.

In some embodiments, Option (1) & (2) are for enrolling in the Fulfillment Request Service for Proxy materials by email, so the email address is mandatory, when a shareholder chooses either (1) or (2).

In some embodiments, Option (3) and (4) is for enrolling in the Fulfillment Request Service for proxy materials by mail or printed copies of the materials, so the email address is optional. The email address provided with either of these options will be ignored or recorded in the database for future use.

Example 12

In some embodiments, the instant invention can have one or more of the following additional functionalities.

1) The mobile proxy voting website can capture fulfillment requests (the fulfillment option may be made available up until 12 months after meeting date.) Since voting is typically allowed only until Meeting Date, the agenda page should not allow voting and only fulfillment between Meeting Date and 12 months after. In some embodiments, the fulfillment options can be also presented as follows:

1) Multilanguage support (e.g., English, French, Dutch, etc.).

2) Providing a wizard to define a default site for each language and market specifically. For example, the below matrix, Table 2, shows the exemplary correspondence to Site ID's:

TABLE 2

| SITE_ID | SITE NAME | MARKET | SITE_LANGUAGE | LANGUAGE_CD |
|---|---|---|---|---|
| 0 | Default (Generic Site) | C | EN | 1 |
| −1 | Default Canada site | BC | EN | 1 |
| −1 | Canada French default site | BC | FR | 2 |
| −2 | Default NetherLand site | NL | NL | 3 |

1) Please send the proxy materials related to this control number to the same address as the Notice at no cost to me.

2) Please send a full set of proxy materials related to this control number by email to the following email address: _____.

3) [ ] Check this box if you'd like to select this preference for all future mailings.

Example 13: Display of Appointee Language

In some embodiments of the instant invention, a proxy voting website can display an Appointee Block, static verbiage relating to the agenda being presented, on the agenda page just above where the votable agenda is displayed. In some embodiments of the instant invention, the display of this section is dynamic and dependent on the existence of a "Flash ID".

Example 14

Shareholder Forum and VSM content when applicable.

In some embodiments of the instant invention, the mobile proxy voting website shareholder portal page is an interim page that is only displayed if the user has logged in to a meeting that has mailed Notice and Access, or that Issuer has a Shareholder Forum or Virtual Shareholder Meeting available.

The Shareholder Forum is a venue for validated shareholders of an Issuer to collaborate with the Issuer and other shareholders. The Virtual Annual Meeting is a web application that hosts an Issuer's annual meeting live online. Validated shareholders can vote, ask questions, and view material while watching the meeting in real time.

In some embodiments, the instant invention can have one or more of the following additional functionalities.

1) The mobile proxy voting website can display information when a Shareholder forum and/or Virtual Meeting is available.

2) Displaying dynamic content on the agenda page.

3) Using indicators (available in the MeetingDTO after calling the getMeetingDetails API) should be referenced to determine if a Shareholder forum and/or Virtual Meeting are available.

Example 15: Multi-Lingual Capability

In some embodiments, the instant invention can have one or more of the following additional functionalities.

In some embodiments, English is a default language. In some embodiments, users are given the ability to toggle between English, French and Dutch on the home page. Once the user logs in with their control number their language preference, as returned by the Account API can be used throughout their user session.

Example 15: Blocking Of Certain Agenda Types

In some embodiments, the instant invention provides ability to block user from accessing agendas not supported in this release and display a message. Examples included Canadian jobs and Contest short slates.

Example 16: Confirmation E-mails

In some embodiments, the instant invention provides e-mail confirmation box on final page that allows user to request an e-mail confirmation. Have users e-mail address filled in as default if available.

Example 17: Contest Short Slate Agendas

In some embodiments, the instant invention provides contest opposition agendas with short slate enabled, display a text box with custom verbiage preceding it. In some embodiments, contest opposition agendas will be used by the voters to vote for the nominees that are not displayed on the voting page.

Example 18: Canadian Appointee Name

On Canadian jobs (BC service type), in some embodiments, the instant invention can display an Appointee text box that allows a shareholder to supply the name of an individual who will serve as their Proxy at the meeting and vote on their behalf.

Canadian Annual Interim Questions (AIQ)

In some embodiments, the instant invention may allow the shareholder to request Annual Interim Financial Statements through extra questions to be displayed at the bottom of the agenda page.

Example 19: Investor Delivery Support

In some embodiments, the instant invention may provide a functionality of electronic delivery of proxy and investment-related materials. In some embodiments, the instant invention may require Investor Delivery exit strategy.

Example 20

In some embodiments, the instant invention can be implemented as shown in FIGS. 4A-4E.

Example 21

In some embodiments, the instant invention can provide a functionality to initiate a voting (e.g., shareholder proxy voting) on a mobile electronic device when a voter uses a mobile electronic device to acquire initiation instruction(s) that activate the voting process on the user's mobile electronic device. In some embodiments, the initiation instruction(s) can be coded into Quick Response Code(s) (e.g., QR code, 2D Bar Code or any other suitable scannable identifier) on a physical printed form(s)/document(s) mailed to voters. In some embodiments, shoppers with a camera phone equipped with the correct reader software may scan the image of the QR Code displayed through an electronic device by the inventive computer system causing the phone's browser to launch and redirect to the programmed URL. This act of linking from physical world objects is known as a hard link or physical world hyperlinks. For example, Google's mobile Android operating system supports the use of QR codes by natively including the barcode scanner (ZXing) on some models and the browser supports URI redirection, which allows QR Codes to send metadata to existing applications on the device. Another example, Nokia's Symbian™ operating system is also provided with a barcode scanner, which is able to read QR Codes.

Figure 7:
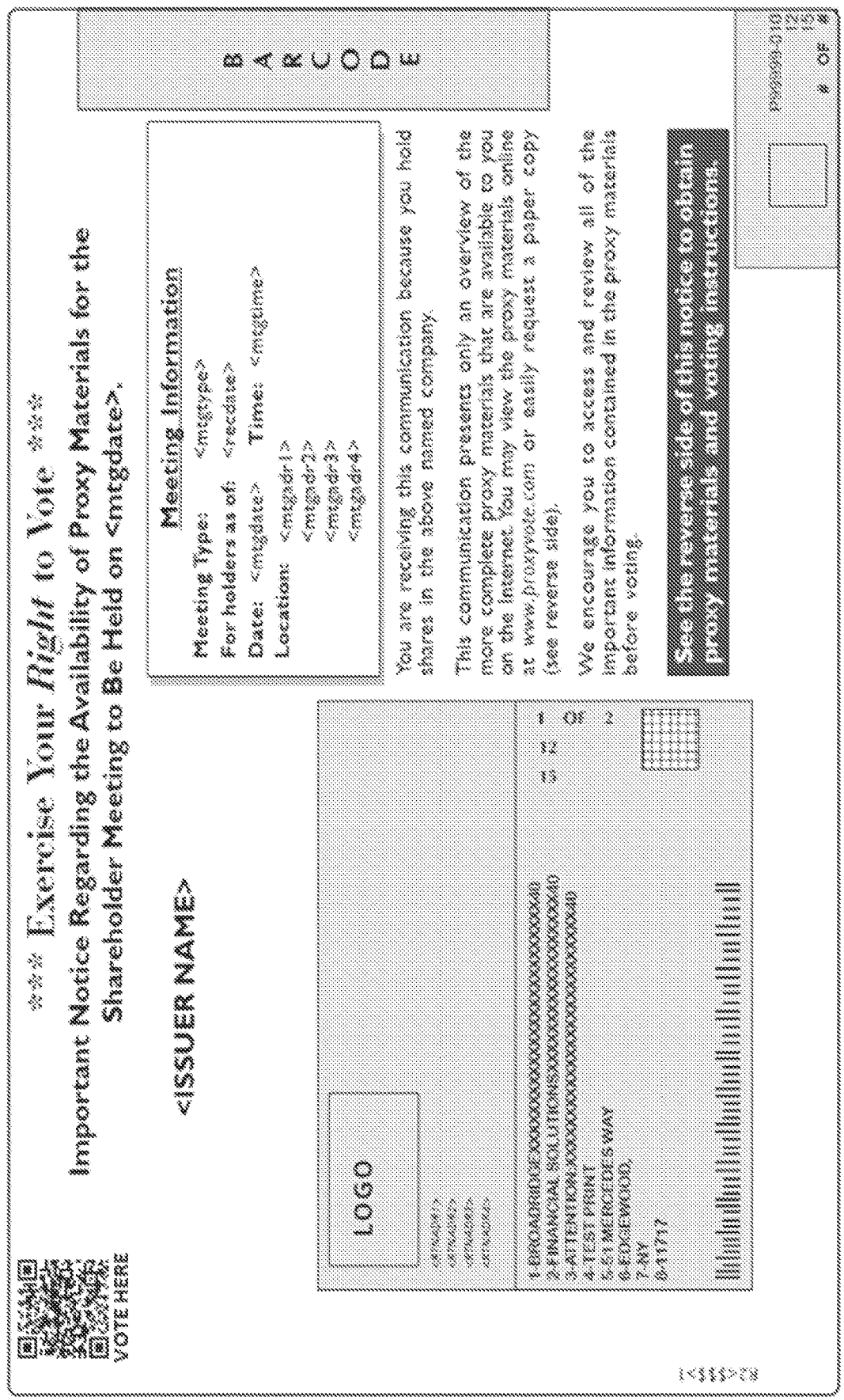
FIG. 7 shows yet another exemplary embodiment of the instant invention.

In some embodiments, as shown in FIG. 7, QR code can be printed on a Proxy Notice which is provided to shareholders. In some embodiments, initiation instruction(s) encoded/embedded in a QR code can include an online locator (e.g., web site, "cloud" source pointer) for voting choices and/or voting material. For example, in some embodiments, initiation instruction(s) encoded/embedded in a QR code can include a resource locator and voter's unique identifier (e.g., a unique number assigned by vote conducting authority or an intermediary that is responsible for gathering votes), as, for example, follows: URL for ProxyVote.com and the voter's embedded control number: www.proxyvote.com/0[control number] (e.g., www.proxyvote.com/012345678912.)

In some embodiments, initiation instruction(s) encoded/embedded in a QR code can include an online locator for voting choices, the voter's unique identifier, and/or the voter's authentication information.

In some embodiments, initiation instruction(s) encoded/embedded in a QR code can include an online locator for voting choices and instructions to identify and/or authenticate the voter by, for example, performing one of the following, but not limiting to, by utilizing the voter's mobile electronic device:
a) identifying the mobile electronic device that the user uses to assess the voting;
b) determining that the user owns the mobile electronic device that the user uses to assess the voting; and
c) electronically requesting from a service provider to confirm the identity of the user who uses the mobile electronic device which is used to assess the voting.

In some embodiments, for example, after the user/voter scans a QR code, initiation instruction(s) encoded/embedded in the QR code can include instruct the user's mobile electronic device to directly bring the user into voting without performing any additional identification and/or authorization procedures.

In some embodiments, a shareholder can use the built-in camera of their mobile device to scan the barcode with an embedded control number and the URL for ProxyVote.com and be taken directly to ProxyVote.com. In some embodiments, the invention allows to combine the voting process of the present invention with a single click access to voting and/or voting materials (e.g., DEF14A) by, for example but not limiting to, just pressing a button on the mobile device.

In some embodiments, the inventive computer system and methods may utilize devices that can communicate via IEEE 802.11b, a wireless networking standard, e.g., wireless chipsets.

In some embodiments, the inventive computer system and methods may utilize devices with technologies such as NetSense™, UPnP™, iReady™, Bluetooth™ as a communication medium.

In another embodiment, a remote voting system can dynamically configure the voter's mobile device with a user interface for voting in accordance with the described embodiments of the present invention. To do so, for example, the voter's mobile device can transmit user interface information that specifies components of a user interface. The user interface information can be structured in an open format. The components can be related to application level control of the service provided by the network appliance. For example, the networked device can use XML to format name-value pairs, i.e., names of components and current values associated with the components. The host then generates the user interface from a component repository and sets values as indicated by the networked device.

In some embodiments, the user interface can also display components related to lower level control such as an information about the networked device (e.g., on, off, online, offline, error, product category, UPC, and the like); communications configuration (e.g., IP address, port, network connection, and the like); position intelligence (e.g., data from Global positioning system (GPS), position on a floor plan, etc.) and/or location intelligence (neighboring networked/non-networked device(s)).

In some embodiments, the instant invention can utilize Near field communications, or NFC, which is a set of short-range wireless technologies, typically requiring a distance of 10 cm or less. NFC operates at 13.56 MHz and at rates ranging from 106 kbit/s to 848 kbit/s. NFC always involves an initiator and a target; the initiator, typically, actively generates a RF field that can power a passive target.

In some embodiments, the encoded paper documents or posters displayed in corporate meetings are initiators and voters' mobile devices are targets. This can enable NFC targets to take very simple form factors such as tags, stickers, key fobs, or cards that do not require batteries.

In some embodiments, NFC can be an open platform technology standardized in, for instance, ECMA-340 and ISO/IEC 18092 standards. These standards specify the modulation schemes, coding, transfer speeds and frame format of the RF interface of NFC devices, as well as initialization schemes and conditions required for data collision-control during initialization for both passive and active NFC modes. Furthermore, they also define the transport protocol, including protocol activation and data-exchange methods.

In some embodiments, voters' electronic device may utilize the CCD (Charge Coupled Device) which is a solid state image pickup device for electro-optically converting the optical image of a code, and the F/E-IC (Front End Integrated Circuit) includes a CDS (Correlation Double Sampling) circuit for performing correlation double sampling used to remove image noise, an AGC (Automatic Gain Control) for performing gain adjusting, an A/D (Analog-to-Digital) converter for performing digital signal conversion, a CCD mechanism which is typically supplied with a vertical synchronization signal (hereinafter, referred to as a VD) and a horizontal synchronization signal (hereinafter, referred to as an SD) from the CCD and controlled by a CPU, and a TG (Timing Generator) for generating a driving timing signal for the F/E-IC.

In some embodiments, the instant invention can provide a computer-implemented method that at least include the steps of: providing, by a computer system, to a mobile electronic device of a voter, information identifying a plurality of vote issues; enabling the mobile electronic device of the voter to transmit to the computer system at least one vote of the voter on at least one vote issue from the plurality of the vote issues, wherein the enabling is based at least in part on: at least one first software instruction that instructs the mobile electronic device of the voter to present a first vote issue from the provided plurality of vote issues, at least one second software instruction that instructs the mobile electronic device of the voter to receive a first vote from the voter on the first vote issue from the provided plurality of vote issues, wherein the voter submits the first vote by a first single action performed immediately after the presentation of the first vote issue and without any intervening action, at least one third software instruction that instructs the mobile electronic device of the voter to transmit the received first vote from the voter on the first vote issue from the provided plurality of vote issues to the computer system, at least one fourth software instruction that instructs the mobile electronic device of the voter to present a second vote issue from the provided plurality of vote issues, at least one fifth software instruction that instructs the mobile electronic device of the voter to receive a second vote from the voter on the second vote issue from the provided plurality of vote issues, wherein the voter submits the second vote by a second single action performed immediately after the presentation of the second vote issue and without any intervening action, at least one sixth software instruction that instructs the mobile electronic device of the voter to transmit the received second vote from the voter on the second vote issue from the provided plurality of vote issues to the computer system, wherein the first vote is transmitted by the mobile electronic device of the voter to the computer system before the second vote is transmitted by the electronic device of the voter to the computer system; and processing, by the computer system, the first and the second votes of the voter as official votes of the voter on the first and second vote issues from the provided plurality of vote issues hereby enabling the voter to separately vote on each vote issue from the provided plurality of vote issues.

In some embodiments of the instant invention, the step of the providing, to the mobile electronic device of the voter, the information identifying the plurality of vote issues can further include receiving from the mobile electronic device of the voter at least one authentication identifier.

In some embodiments of the instant invention, the step of the providing, to the mobile electronic device of the voter, the information identifying the plurality of vote issues can further include identifying the mobile electronic device of the voter as a particular mobile electronic device based, at least in part, on one or more of the following characteristics: a) a brand, b) a model, and c) a geographic location.

In some embodiments of the instant invention, the step of the providing, to the mobile electronic device of the voter, the information identifying the plurality of vote issues can further include reformatting the information identifying the plurality of vote issues for displaying on the particular mobile electronic device.

In some embodiments of the instant invention, the step of the providing, to the mobile electronic device of the voter, the information identifying the plurality of vote issues can further include: providing at least one access instruction to the voter, where the at least one access instruction is in coded on a paper document, and where the at least one access instruction allows the voter to receive, utilizing the mobile electronic device, the information identifying the plurality of vote issues. In some embodiments of the instant invention, the at least one access instruction allows the voter to receive, by performing a single action with the mobile electronic device, the information identifying the plurality of vote issues. In some embodiments of the instant invention, the single action is when the voter taps on a button of the mobile electronic device, instructing the mobile electronic device to acquire the at least one access instruction. In some embodiments of the instant invention, the at least one access instruction is encoded on the paper document in at least one QR code. some embodiments of the instant invention, the mobile electronic device acquires the at least one access instruction by acquiring at least one image of the at least one QR code.

In some embodiments, the instant invention can provide a computer system that at least includes the following components: a non-transient memory having at least one region for storing computer executable program code; and at least one processor for executing the program code stored in the non-transient memory, wherein the program code that at least includes: code to provide to a mobile electronic device of a voter, information identifying a plurality of vote issues; code to enable the mobile electronic device of the voter to transmit to the computer system at least one vote of the voter on at least one vote issue from the plurality of the vote issues, wherein the enabling is based at least in part on: at least one first software instruction that instructs the mobile electronic device of the voter to present a first vote issue from the provided plurality of vote issues, at least one second software instruction that instructs the mobile electronic device of the voter to receive a first vote from the voter on the first vote issue from the provided plurality of vote issues, wherein the voter submits the first vote by a first single action performed immediately after the presentation of the first vote issue and without any intervening action, at least one third software instruction that instructs the mobile electronic device of the voter to transmit the received first vote from the voter on the first vote issue from the provided plurality of vote issues to the computer system, at least one fourth software instruction that instructs the mobile electronic device of the voter to present a second vote issue from the provided plurality of vote issues, at least one fifth software instruction that instructs the mobile electronic device of the voter to receive a second vote from the voter on the second vote issue from the provided plurality of vote issues, wherein the voter submits the second vote by a second single action performed immediately after the presentation of the second vote issue and without any intervening action, at least one sixth software instruction that instructs the mobile electronic device of the voter to transmit the received second vote from the voter on the second vote issue from the provided plurality of vote issues to the computer system, wherein the first vote is transmitted by the mobile electronic device of the voter to the computer system before the second vote is transmitted by the electronic device of the voter to the computer system; and code to process the first and the second votes of the voter as official votes of the voter on the first and second vote issues from the provided plurality of vote issues hereby enabling the voter to separately vote on each vote issue from the provided plurality of vote issues.

In some embodiments, the instant invention can provide a mobile electronic device that at least includes the following components: at least one processor programmed to execute program code received by the mobile electronic device from a computer system, wherein the mobile electronic device and the computer system are connected through a network and wherein the program code at least includes: code to provide to the voter information identifying a plurality of vote issues; and code to enable the mobile electronic device to transmit at least one vote of the voter on at least one vote issue from the plurality of the vote issues, wherein the enabling is based at least in part on: at least one first software instruction that instructs the mobile electronic device of the voter to present a first vote issue from the provided plurality of vote issues, at least one second software instruction that instructs the mobile electronic device of the voter to receive a first vote from the voter on the first vote issue from the provided plurality of vote issues, wherein the voter submits the first vote by a first single action performed immediately after the presentation of the first vote issue and without any intervening action, at least one third software instruction that instructs the mobile electronic device of the voter to transmit the received first vote from the voter on the first vote issue from the provided plurality of vote issues, at least one fourth software instruction that instructs the mobile electronic device of the voter to present a second vote issue from the provided plurality of vote issues, at least one fifth software instruction that instructs the mobile electronic device of the voter to receive a second vote from the voter on the second vote issue from the provided plurality of vote issues, wherein the voter submits the second vote by a second single action performed immediately after the presentation of the second vote issue and without any intervening action, at least one sixth software instruction that instructs the mobile electronic device of the voter to transmit the received second vote from the voter on the second vote issue from the provided plurality of vote issues, wherein the first vote is transmitted by the mobile electronic device of the voter before the second vote is transmitted by the electronic device of the voter hereby enabling the voter to separately vote on each vote issue from the provided plurality of vote issues.

In some embodiments of the instant invention, the first and the second votes of the voter are official votes of the voter on the first and second vote issues from the provided plurality of vote issues.

Illustrative Operating Environments of Some Embodiments of the Instant Invention Example 21

Figure 5:
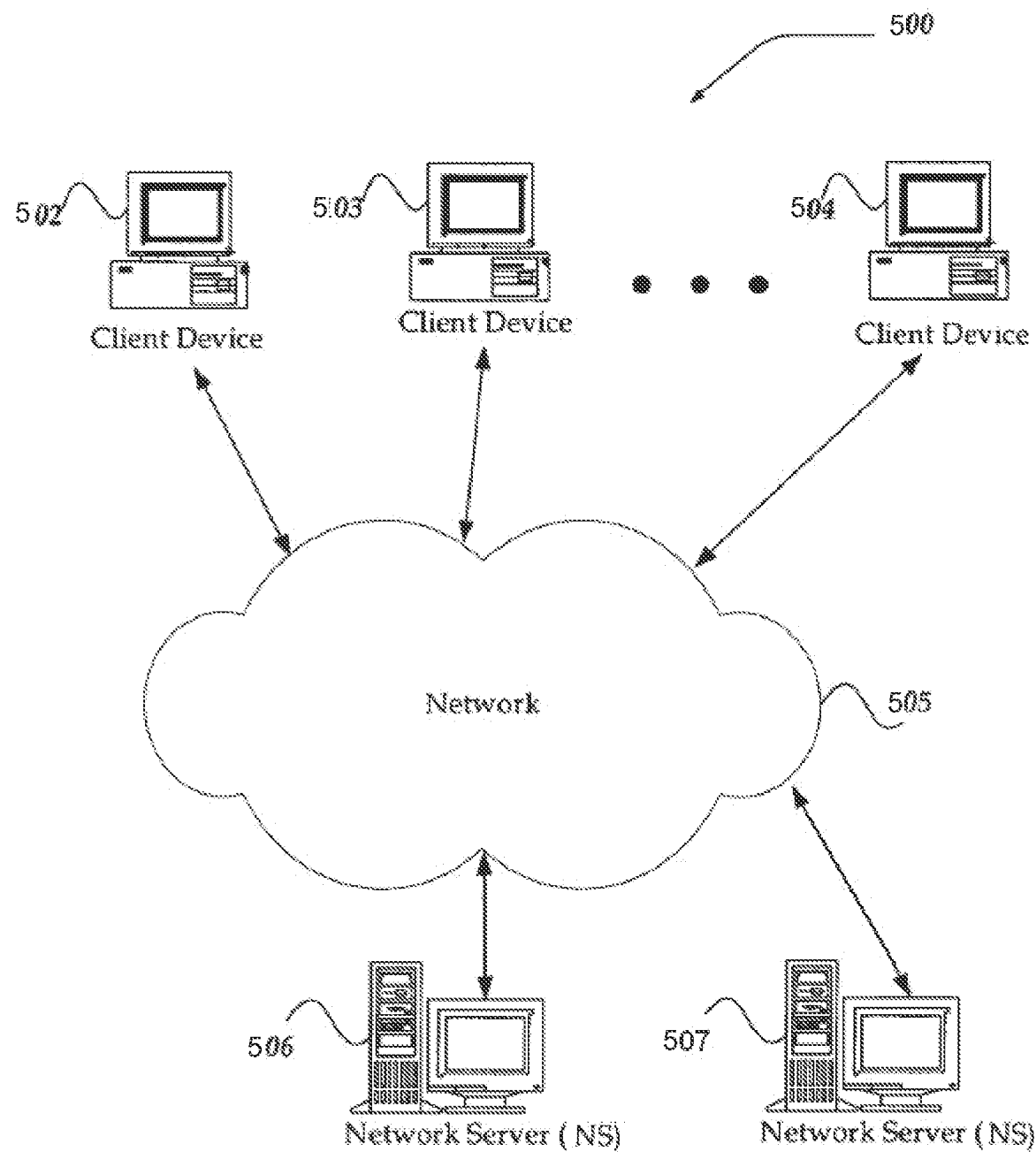
FIG. 5 shows an exemplary embodiment of a computer and network system, utilized in some embodiments of the instant invention.

FIG. 5 illustrates one embodiment of an environment in which the present invention can operate. However, not all of these components may be required to practice the invention, and variations in the arrangement and type of the components may be made without departing from the spirit or scope of the invention. In some embodiment, the system hosts a large number of members and concurrent transactions. In other embodiments, the system is based on a scalable computer and network architecture that incorporates varied strategies for assessing the data, caching, searching, and database connection pooling. An example of the scalable architecture is an architecture that is capable of operating multiple servers.

In some embodiments, client devices 502-504 include virtually any computing device capable of receiving and sending a message over a network, such as network 505, to and from another computing device, such as servers 506 and 507, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 502-504 are any mobile device that is capable of connecting using a wired or wireless communication medium such as a PDA, POCKET PC, wearable electronic device (such as cellular phone, smart phone, or other equivalent mobile devices), and any other device that is equipped to communicate over a wired and/or wireless communication medium.

In some embodiments, each client device within client devices 502-504 includes a browser application that is configured to receive and to send web pages, and the like. In embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, The Investor Network is programmed in either Java or .Net.

In embodiments, client devices 502-504 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 505 is configured to couple one computing device to another computing device to enable them to communicate. In embodiments, network 105 is enabled to employ any form of computer readable media for communicating information from one electronic device to another. Also, in embodiments, network 505 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 505 includes any communication method by which information may travel between client devices 502-504, and servers 506 and 507.

Example 22

Figure 6:
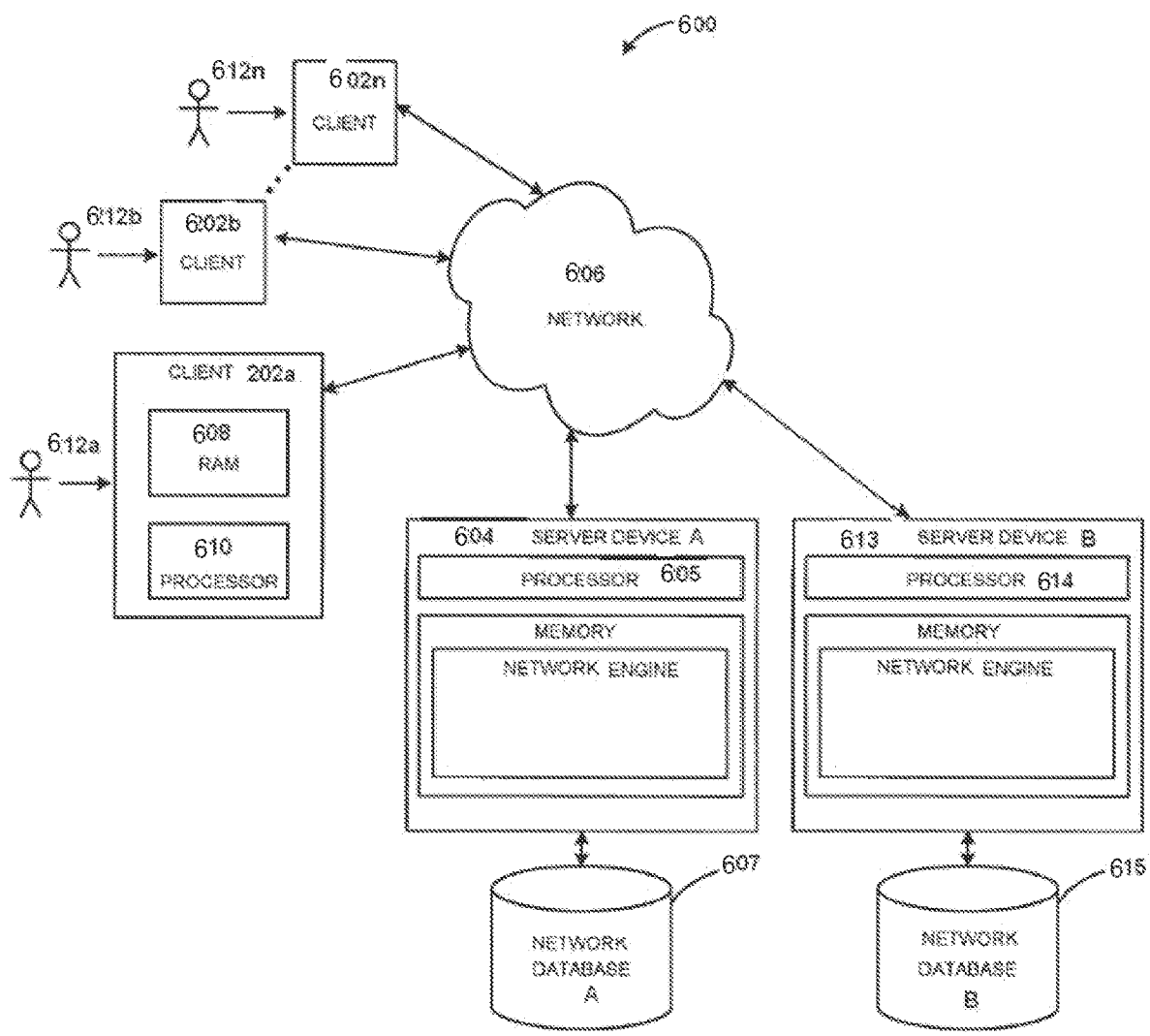
FIG. 6 shows yet another exemplary embodiment of a computer and network system, utilized in some other embodiments of the instant invention.

FIG. 6 shows another exemplary embodiment of the computer and network architecture that can support the disclosed systems and methods of the instant invention. The client devices 602a, 602b thru 602n shown each comprises a computer-readable medium, such as a random-access memory (RAM) 608 coupled to a processor 610. The processor 610 executes computer-executable program instructions stored in memory 608. Such processors comprise a microprocessor, an ASIC, and state machines. Such processors comprise, or are in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 610 of client 602a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client devices 602a-n also comprise a number of external or internal devices such as a mouse, a CD-ROM, DVD, a keyboard, a display, or other input or output devices. Examples of client devices 602a-n are personal computers, digital assistants, personal digital assistants, cellular phones, mobile phones, smart phones, pagers, digital tablets, laptop computers, Internet appliances, and other processor-based devices. In general, a client device 602a are any type of processor-based platform that is connected to a network 206 and that interacts with one or more application programs. Client devices 602a-n operate on any operating system capable of supporting a browser or browser-enabled application, such as Microsoft™, Windows™, or Linux. The client devices 202a-n shown include, for example, personal computers executing a browser application program such as Microsoft Corporation's Internet Explorer™, Apple Computer, Inc.'s Safari™, Mozilla Firefox, Google Chrome, and/or Opera.

Through the client devices 602a-n participants 612a-n communicate over the network 606 with the system. As shown in FIG. 6, server devices 604 and 613 are also coupled to the network 606.

For the purposes of this disclosure, a computer readable medium is a medium that stores computer data/instructions in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer system(s), computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. Further, any steps described herein may be carried out in any desired order (and any steps may be added and/or deleted).

What is claimed is:

1. A portable computing device comprising:
   at least one processor;
   a non-transient computer media, storing computer instructions; and
   wherein, when the at least one processor executes the computer instructions, the portable computing device is programmed to:
   transmit an electronic request to establish a user session related to an event,
      wherein the electronic request comprises a user-specific event-specific identifier that is uniquely related to a user and the event;
   display, during the user session, at least one user-specific app-like graphical user interface comprising:
      a first interface area displaying a text-based content related to the user-specific event-specific identifier and the event,
      a second interface area displaying a live virtual event content related to the user-specific event-specific identifier and the event,
      at least one graphical user interface element that has been programmed to automatically execute at least one user-specific action related to the event when a user activates the at least one graphical user interface element in a single action,
      wherein the first interface area and the second interface area are different, and
      wherein, during the session, the portable computing device provides, via the at least one app-like graphical user interface, an app-like experience that is based on:
         the user-specific event-specific identifier and
         a plurality of:
            a type of the portable computing device,
            a resolution of the portable computing device,
            a size of a screen of the portable computing device, a capability of the portable computing device,
a geographic location of the portable computing device, and
any combination thereof;
transmit, during the user session, at least one instruction to automatically execute at least one user-specific action related to the event when a user activates the at least one graphical user interface element in a single action; and
wherein the portable computing device maintains the at least one user-specific app-like graphical user interface only during the user session.

2. The portable computing device of claim 1, wherein the event is a voting event and the user-specific event-specific identifier is a user-specific voting event-specific control number.

3. The portable computing device of claim 2, wherein the electronic request to establish the user session comprises an authentication request that instructs to authenticate the user before the user session is established.

4. The portable computing device of claim 2, wherein the at least one user-specific app-like graphical user interface is programmed to make an application call to authenticate the user before the at least one user-specific app-like graphical user interface displays the text-based content and the live virtual event content.

5. The portable computing device of claim 2,
wherein the computer instructions comprise at least one first computer instruction that is stored in the non-transient computer media of the portable computing device prior to the user session is established; and
wherein, when the at least one processor executes the at least one first computer instruction, the portable computing device is programmed to transmit the electronic request to establish the user session related to the event.

6. The portable computing device of claim 2, wherein the computer instructions comprise at least one second computer instruction that is stored in the non-transient computer media of the portable computing device after the user session is established; and wherein, when the at least one processor executes the at least one second computer instruction, the portable computing device is programmed to display, during the user session, the at least one user-specific app-like graphical user interface related to the event.

7. The portable computing device of claim 2, further comprising:
a camera;
wherein the computer instructions comprise reader instructions;
wherein, when the at least one processor executes the reader instructions, the portable computing device is programmed to obtain the user-specific voting event-specific identifier from a scannable identifier located on a document.

8. The portable computing device of claim 7, wherein the scannable identifier is a Quick Response (QR) Code, comprising an encoded version of the user-specific voting event-specific identifier.

9. The portable computing device of claim 2, wherein the text-based content comprises at least one voting item that is related to the user-specific voting event-specific control number.

10. The portable computing device of claim 9, wherein the at least one voting item is a voting questionnaire for the voting event.

11. The portable computing device of claim 2,
wherein the text-based content comprises an annual meeting agenda item that is related to the user-specific voting event-specific control number; and
wherein the live virtual event content comprises a live virtual annual shareholder meeting of a publicly traded company.

12. The portable computing device of claim 10, wherein the live virtual event content comprises a real time virtual meeting of a publicly traded company.

13. The portable computing device of claim 11,
wherein the voting event is a proxy voting event;
wherein the computer instructions comprise at least one first computer instruction;
wherein the portable computing device is programmed to transmit the electronic request after the portable device is utilized by the user to activate a smart link encoded with the user-specific event-specific identifier; and
wherein the electronic request causes to log the user directly into the proxy voting event so that, after the user is logged into the proxy voting event, the portable computing device receives the at least one first computer instruction; and
wherein, when the at least one processor executes the at least one first computer instruction, the portable computing device is programmed to display, during the user session, the at least one user-specific app-like graphical user interface related to the proxy voting event.

14. The portable computing device of claim 2,
wherein the at least one user-specific action is to vote on at least one first voting item in the voting event; and
wherein the at least one graphical user interface element is a first graphical user interface element programmed, upon being activated by the user in the single action, to automatically launch another voting interface that is different from the at least one user-specific app-like graphical user interface and automatically provide the user-specific voting event-specific identifier to the another voting interface so that the user can make at least one voting decision on the at least one first voting item in the voting event via the another voting interface.

15. The portable computing device of claim 14, wherein the another voting interface is a telephone voting interface; and
wherein the first graphical user interface element programmed, upon being activated by the user in the single action, to utilize the portable computing device to automatically call the telephone voting interface so that the user-specific voting event-specific identifier is automatically provided to the telephone voting interface to allow the user to make at least one voting decision on the at least one first voting item in the voting event via the telephone voting interface.

16. The portable computing device of claim 14,
wherein the text-based content comprises a voting confirmation data that is automatically updated with a combination of voting decisions made by the user through the at least one user-specific app-like graphical user interface and the another voting interface.

17. The portable computing device of claim 15,
wherein the text-based content comprises a voting confirmation data that is automatically updated with a combination of voting decisions made by the user through the at least one user-specific app-like graphical user interface and the telephone voting interface.

18. The portable computing device of claim 2, wherein the user-specific voting event-specific identifier is valid for voting during a predetermined time period.

19. The portable computing device of claim 11, wherein the user-specific voting event-specific identifier is further uniquely related to a number of shares of a stock of the publicly traded company.

20. The portable computing device of claim 1, wherein the portable computing device is a mobile phone.

21. The portable computing device of claim 11, wherein the portable computing device is a mobile phone.

22. A method comprising:
instructing, by a processor, a portable computing device to transmit an electronic request to establish a user session related to an event,
    wherein the electronic request comprises a user-specific event-specific identifier that is uniquely related to a user and the event;
instructing, by the processor, the portable computing device to display, during the user session, at least one user-specific app-like graphical user interface comprising:
    a first interface area displaying a text-based content related to the user-specific event-specific identifier and the event,
    a second interface area displaying a live virtual event content related to the user-specific event-specific identifier and the event,
    at least one graphical user interface element that has been programmed to automatically execute at least one user-specific action related to the event when a user activates the at least one graphical user interface element in a single action,
    wherein the first interface area and the second interface area are different, and
    wherein, during the session, the portable computing device provides, via the at least one app-like graphical user interface, an app-like experience that is based on:
        the user-specific event-specific identifier and
        a plurality of:
            a type of the portable computing device,
            a resolution of the portable computing device,
            a size of a screen of the portable computing device,
            a capability of the portable computing device,
            a geographic location of the portable computing device, and
            any combination thereof;
instructing, by the processor, the portable computing device to transmit, during the user session, at least one instruction to automatically execute at least one user-specific action related to the event when a user activates the at least one graphical user interface element in a single action; and
wherein the portable computing device maintains the at least one user-specific app-like graphical user interface only during the user session.

23. The method of claim 22,
wherein the portable computing device is one of a mobile phone, a tablet, or a laptop; and
wherein the event is a voting event and the user-specific event-specific identifier is a user-specific voting event-specific control number.

24. The method of claim 23, wherein the text-based content comprises at least one voting item that is related to the user-specific voting event-specific control number.

25. The method of claim 24, wherein the at least one voting item is a voting questionnaire for the voting event.

26. The method of claim 23, wherein the text-based content comprises an annual meeting agenda item that is related to the user-specific voting event-specific control number; and
    wherein the live virtual event content comprises a live virtual annual shareholder meeting of a publicly traded company.

27. A system comprising:
at least one server that comprises:
    at least one processor;
    a non-transient computer media, storing computer instructions; and
wherein, when the at least one processor executes the computer instructions, the at least one server is programmed to:
    instruct a portable computing device to transmit an electronic request to establish a user session related to an event,
        wherein the electronic request comprises a user-specific event-specific identifier that is uniquely related to a user and the event;
    instruct the portable computing device to display, during the user session, at least one user-specific app-like graphical user interface comprising:
        a first interface area displaying a text-based content related to the user-specific event-specific identifier and the event,
        a second interface area displaying a live virtual event content related to the user-specific event-specific identifier and the event,
        at least one graphical user interface element that has been programmed to automatically execute at least one user-specific action related to the event when a user activates the at least one graphical user interface element in a single action,
        wherein the first interface area and the second interface area are different, and
        wherein, during the session, the portable computing device provides, via the at least one app-like graphical user interface, an app-like experience that is based on:
            the user-specific event-specific identifier and
            a plurality of:
                a type of the portable computing device,
                a resolution of the portable computing device,
                a size of a screen of the portable computing device,
                a capability of the portable computing device,
                a geographic location of the portable computing device, and
                any combination thereof;
    instruct the portable computing device to transmit, during the user session, at least one instruction to automatically execute at least one user-specific action related to the event when a user activates the at least one graphical user interface element in a single action; and
    wherein the portable computing device maintains the at least one user-specific app-like graphical user interface only during the user session.

28. The system of claim 27,
wherein the portable computing device is one of a mobile phone, a tablet, or a laptop; and wherein the event is a voting event and the user-specific event-specific identifier is a user-specific voting event-specific control number.

29. The system of claim 28, wherein the text-based content comprises at least one voting item that is related to the user-specific voting event-specific control number.

30. The system of claim 29, wherein the at least one voting item is a voting questionnaire for the voting event.

31. The system of claim 28, wherein the text-based content comprises an annual meeting agenda item that is related to the user-specific voting event-specific control number; and wherein the live virtual event content comprises a live virtual annual shareholder meeting of a publicly traded company.

\* \* \* \* \*